United States Patent Office 3,544,523
Patented Dec. 1, 1970

3,544,523
POLYCONDENSATION OF SOLID POLYESTERS WITH ANTICAKING AGENTS
Emil J. Maxion, North Brunswick, N.J., assignor to Mobil Oil Corporation, a corporation of New York
No Drawing. Filed June 13, 1969, Ser. No. 833,177
Int. Cl. C08g 17/003
U.S. Cl. 260—75
19 Claims

ABSTRACT OF THE DISCLOSURE

Thermoplastic linear polyester resins derived from dihydric alcohol esters of carbocyclic dicarboxylic acids (e.g., polyethylene terephthalate having a reduced specific viscosity of 0.4 to 1.3 or a molecular weight of 9000 to 34,000) and having relatively low sticking temperatures (110–150 °C.) are treated with a minor amount of an inert refractory liquid or powdered anticaking agent (talc), and the resulting treated resins are then subjected to polycondensation in the solid state at temperatures above their original sticking temperatures and usually at improved polymerization rates to produce resins of substantially higher molecular weight.

CROSS-REFERENCES TO RELATED APPLICATIONS

This application contains claims to features of the present invention in combination with certain other features which are described and claimed per se in my concurrently filed application Ser. No. 833,155. Also, features of the instant invention are claimed in my concurrently filed joint application with Andrew J. Foglia, Ser. No. 833,156, in combination with certain other features described in said joint application.

BACKGROUND OF THE INVENTION

Field of the invention

This invention relates to an improved process for the preparation of high molecular weight linear polyester resins by the solid phase polymerization or polycondensation of polyesters of lower molecular weight.

Prior art

There is an increasing demand for resins derived from the homopolymerization and copolymerization of esters of ethylene glycol and terephthalic acid in varying degrees of polymerization as exemplified by a number average molecular weight of the order of 17,000 for textile fibers in general or about 30,000 for tire cord grade material, and interest is being displayed in the injection molding and blow molding of material of higher molecular weight, such as 36,000 or more. The aforesaid molecular weights correspond to approximately 0.7, 1.15 and 1.4 RSV, respectively, where RSV represents the reduced specific viscosity of a solution of 5 grams of the resin dissolved in one liter of a mixture of equal weights of phenol and tetrachloroethane when determined at 25° C. and calculated in known manner.

The common commercial practice for producing polyethylene terephthalate involves melt-polymerization in which the material is maintained in the molten state at relatively high temperatures of 265 to 300° C. during the entire process. Typical preparations of this type are described in Whinfield et al. Pat. No. 2,465,319, in "Preparatory Methods of Polymer Chemistry" by W. R. Sorenson and T. W. Campbell, Interscience Publishers (1961), page 113, and in "Macromolecular Synthesis," C. G. Overberger, Ed., John Wiley & Sons (1963), vol. 1, pages 17–23. Melt-polymerization has a number of limitations and disadvantages inasmuch as a simple stirred kettle apparatus can only be employed for polymerizing the material up to a maximum of about 0.4 RSV; then the material must be transferred to a heated and vented extruder or dough mixer type of apparatus capable of providing the powerful agitation necessary for the release of glycol evolved in the reaction from the highly vicous molten resin, and such further processing is limited to a maximum degree of polymerization equivalent to an RSV of approximately 1.3 which is rather unsatisfactory for blow or injection molding or other utilizations in which a very high molecular weight resin is desired. Besides requiring expensive equipment and a high consumption of power, difficulties are frequently encountered in this method in discoloration of the resin by excessive heat generated by the heavy shear forces in mixing the melt.

Many proposals for solid state polymerization of polyethylene terephthalate and similar polyesters have been made, and these have often mentioned the initial formation of a prepolymer or low order polymeric material by melt-polymerization followed by polycondensation of the prepolymer in the solid state by further heating at lower temperatures. While there are a number of known advantags for solid phase post-polymerization of polyesters as exemplified by the use of simpler equipment, lower manufacturing costs, improved product color, lower content of combined diethylene glycol as well as higher melting points, and higher molecular weight polymers; nevertheless, the difficulties and problems experienced in solid state polycondensation as described hereinafter have precluded its commercial use on any substantial scale.

These earlier proposals for the solid phase polymerization have generally involved the processing of relatively small particles, for instance, Pat. No. 2,534,028 mentions using fine powders smaller than 20 mesh to increase the reaction rate. Pats. Nos. 3,342,782, 3,330,809 and 3,075,952 disclose suspending prepolymers in the fluidized condition in a stream of hot inert gas. In Pats. Nos. 2,901,466, 3,344,091 and 3,117,950 polymerization is accomplished by stirring and heating prepolymer particles in an inert atmosphere under very low pressure; and hot inert gases have been employed in polycondensing static beds of pulverized prepolymers at atmospheric pressure.

High polymerization rates are generally desirable in commercial practice and these require substantially elevated temperatures, but reaction temperatures have been severely restricted by the relatively low sticking temperature of polyester prepolymers. It is to be emphasized that the softening and sticking points are usually considerably below the crystalline or equilibrium melting temperatures of polyesters.

The expression "sticking temperature" is used herein to correspond with the definition on page 49 of the aforesaid Sorenson et al. text of the polymer-melting temperature as that temperature where a polymer sample becomes molten and leaves a trail when moved across a hot metal surface with moderate pressure; and this is commonly determined on a metal bar or elongated plate heated in such manner as to establish a temperature gradient along its length. A thermocouple may be used to determine the temperature a the point where the trail begins.

The softening temperature is conveniently determined by the Vicat needle test described in ASTM method D1525–65T.

The crystalline melting temperature (equilibrium melting temperature) is also defined in the Sorenson et al. book on page 45 as "that temperature where the last trace of crystallinity disappears under equilibrium conditions". This melting point may be determined with substantially accuracy by differential scanning thermal analysis at a heating rate of 20° C./min., as described by W. W. Wendland, in "Chemical Analysis," Interscience Publishers, New York, N.Y., vol. 19, Chapter 5 (1964), much more rapidly and also more conveniently than by actual equilibrium melting point determinations.

The solid phase polycondensation of polyesters has been held back mainly by the tendency of the polymer particles to agglomerate when the sticking temperature is reached and to form a large massive cake at temperatures well below the melting point of the resin. In the case of fluidized bed systems, fluidization is terminated by agglomeration. When static beds of resin particles fuse, the passage of an inert carrier gas and the removal of ethylene glycol from the conglomerate is greatly hampered with a corresponding reduction in process efficiency. In prepolymer beds of substantial depth, severe compaction takes place with both powders and granules. Finally, the difficulty in removing the caked resin from the reactor is greatly increased by its adhesion to equipment walls.

Polyethylene terephthalate exhibits various solid-liquid transition temperatures at which the material begins to flow under stress at a rate which is determined by the viscosity of the polymer. Amorphous resins of relatively low molecular weight (e.g., about 0.4 RSV) soften and collapse under a load of about 70° C. and particles of the material cohere to form an agglomerate and adhere to stainless steel at about 110–150° C. depending on the load applied. Understandably, low molecular weight polymeric material deforms and sinters more readily than a higher molecular weight resin. The sticking temperature mentioned earlier provides a good overall measure of the adhesion and softening characteristics that promote agglomeration.

The resistance of polyester prepolymers and resins towards sticking at elevated temperatures is also affected by the composition of the polymer or copolymer; however, the crystalline melting point is similarly affected as a high melting resin has a higher sticking temperature than a resin having a low melting point. Accordingly, determination of the crystalline or equilibrium melting point affords a convenient method of assessing the effects of resin composition. For illustration, polyethylene terephthalate prepolymer usually contains a small amount of combined diethylene glycol and this has a profound effect upon the melting point of the resin. For instance, the melting point of polyethylene terephthalate containing only 0.6% combined diethylene glycol by weight is 270° C. whereas a similar resin with a content of 3.6% has a melting point of 250° C. On the other hand, the melting point of poly-(1,4-cyclohexanedimethylene terephthalate) is about 290° C.

The undesirable effects of such agglomeration in the solid phase polycondensation technique have long been recognized. Various proposals for solving the problem have been made with only limited degrees of success, because it is necessary to employ relatively low polymerization temperatures thereby restricting the rate of polycondensation. For instance, Pat. No. 3,014,011 describes the treatment of polyethylene terephthalate pellets with steam or organic solvents and vapors to produce crystalline products which do not stick together at 160° C. In the process of Pat. No. 3,330,809, the particles of polyethylene terephthalate are kept in vigorous motion while being instantaneously heated through a critical "glass temperature" range from 69° C. to about 130–200° C. and the crystallized polymer is then polycondensed as a fluidized powder at 218° C. Heighton et al. Pat. No. 3,405,098 is concerned with forming an amorphous prepolymer by quenching a melt-polymerization product followed by heating at 150–200° C. to form a partially crystallized polyester that is ground to 20–200 mesh and then further polymerized at 215–225° C. under vacuum. The maximum viscosity of the prepolymer used in that process appears to be limited considerably by grinding and other considerations; and the polycondensation temperatures are also quite restricted for it is stated that agglomeration occurs above 235° C. no matter how crystalline the prepolymer may be and there is also a caution as to fluidization difficulties above 225° C. Small charges of resin have also been suggested to minimize agglomeration, but this entails an undesirable reduction in production capacity. While higher temperatures ranging up to 250° C. have been mentioned in the prior art for the solid state polycondensation of polyethylene terephthalate, such disclosures apparently relate only to laboratory scale experimentation without specifying how the agglomeration problem was solved; hence there is no reason to presume that large scale operations at such temperatures were feasible heretofore.

In view of the limitations and difficulties encountered with prior methods of polycondensing polyesters, there is a need for improved methods for performing such polycondensations in the solid state in general, particularly in a simpler and more economical process, as well as for providing greater flexibility as to reaction rates by the use of higher reaction temperatures and/or obtaining higher molecular weight products than were feasible in prior commercial production.

While suggestions have been made for incorporating various powdered solids with polyester resins, these additives were employed in a different manner and usually in a different proportion for different objectives than in the treatment of the present invention. For example, Indian Pat. 111,152 describes adding a very small amount of magnesium stearate ranging up to only 0.1% to granules of an unspecified polyester of unstated molecular weight to minimize sticking or cohesion while the amorphous resin is being heated to convert it to the crystalline phase at very slowly increasing temperatures from 80° up to 150° C. in a vane drier prior to extrusion; however, it is stated that sticking of the granules is still encountered at temperatures of 80–95° C. until phase conversion has progressed. Also, British Pat. 1,117,139 discloses the incorporation into polyethylene terephthalate of a combination of a small amount of certain liquids and 0.001–0.5% of talcum or other inorganic powders for the purpose of improving the internal crystal structure of the resin during molding with the powder suspended within the resin melt. Neither patent mentions polycondensing a solid resin while any anticaking agent is distributed on the surfaces of the resin.

SUMMARY OF THE INVENTION

The present invention is an improved process for increasing the molecular weight of polyester resins by distributing a heat-resistant or refractory anticaking agent of an inert nature on the surface of a solid thermoplastic resin containing linear polymers of at least one ester of at least one dihydric alcohol and at least one carbocyclic dicarboxylic acid, and thereafter subjecting the resulting treated resin in the solid state to polycondensation conditions for a period sufficient to substantially increase the molecular weight of said resin.

Narrower aspects of the invention relate to the combination in the aforesaid process of one or more of such features as treating a resin that has a reduced specific viscosity (RSV), as defined hereinbefore, of at least about 0.2, and preferably in the range of about 4.0 to 1.3 or more; polycondensing the treated resin at temperatures above the sticking temperature of the untreated resin as exemplified by reaction temperatures which are often above 240, and even above 250° C. in at least some instances; preferred types and species of resins, such as polyethylene terephthalate; preferred proportions and types and species of anticaking substances, and to utilizing the heating technique described and claimed in my aforesaid application, Serial No. 833,155.

DESCRIPTION OF SPECIFIC EMBODIMENTS

It has now been found that the application of small quantities of anticaking agents to the surface or surfaces of solid polyester resins eliminates or minimizes sticking and agglomeration of the particles to any significant degree at relatively high temperatures; consequently the treated resins can now be subjected to solid state polycondensation at temperatures higher than their usual sticking temperatures and often extending up to within above 5° C. or less of their crystalline melting points. Also, an amorphous resin treated with the anticaking agent may be subjected to polycondensation temperatures without the usual preliminary crystallization. Accordingly, polyester resins of low or intermediate molecular weight can now be efficiently polycondensed or further polymerized over a wider range of polymerization temperatures than heretofore, and the degree of polymerization may optionally be carried further to provide resins having molecular weights higher than those obtainable in previous commercial operations. Thus, significant benefits are obtainable with the novel and simple process of this invention.

While the present description is concerned to a large extent with the polycondensation of polyethylene terephthalate prepolymer by reason of the commercial importance of this material and also to provide valid comparisons in the examples hereinafter, the method is also suitable for the treatment of similar homopolymers and copolymers that tend to cohere or adhere at solid state polycondensation temperatures. These may be exemplied by such glycol-terephthalate resins as the homo- and copolymeric esters of terephthalic, chloroterephthalic, nitroterephthalic or hydrogenated terephthalic acids with one or more glycols, such as ethylene glycol, propylene glycol, 2,2-dimethyl-propanediol-1,3, 1,4-butene glycol and 1,4-cyclohexanedimethanol, as well as copolymers of the type which may be derived from one or more of those glycols and a plurality of acids comprising (1) substituted and unsubstituted terephthalic acids as just described and also (2) one or more of such acids as adipic, sebacic or 2,6-naphthalene dicarboxylic acids. For instance, suitable copolyesters may be prepared from terephthalic acid and a mixture of ethylene glycol and 2,2-dimethyl-propanediol-1,3, or from ethylene glycol and a mixture of a major proportion of terephthalic acid and a minor proportion of isophthalic acid. It will be appreciated that the polyesters involved here are not limited to those prepared from such glycols and acids per se, for other preparatory methods are usually suitable as exemplified by the esterification of terephthalic acid with alkylene oxides, such as ethylene oxide, or the transesterification of dimethyl terephthalate with ethylene glycol. Any such linear polyesters which have an RSV of at least about 0.2 (number average molecular weight of at least about 4000 in the case of polyethylene terephthalate) or more may be advantageously treated acording to the present process and the starting materials usually have an RSV of about 0.4 to 1.3 or more (polyethylene terephthalate molecular weight above about 9000).

Representative anticaking agents are minerals of natural occurrence, such as talc, kaolin, anthopyllite asbestos, gypsum, etc. Many inorganic oxides are also suitable including the oxides and carbonates of silicon, aluminum, titanium, calcium, iron and magnesium. Titanium dioxide may be used to advantage in relatively small proportions where a delustering of the resin is desired, or in much larger quantities that are left in the resin composition to pigment the resin in its eventual fabrication. Fumed silicas are particularly desirable by reason of their high surface area, and they may be used in their pristine state or when coated with agents to render them hydrophobic or hydrophilic. Aluminum hydroxide and impalpable boric acid are also appropriate for the purpose. Oils boiling above 300° C., as exemplified by polysiloxanes, alkyl-substituted polysiloxanes and similar silicone oils as well as liquid fluorocarbons are also effective, as are the nonalkali metal soaps of higher fatty acids containing 12 or more carbon atoms, such as aluminum, magnesium and calcium stearates. In general, any of the many known anticaking agents which are both inert with respect to polyester resins and refractory in nature, that is capable of remaining nontacky and not subject to excessive vaporization at temperatures up to about 300° C.

Suitable proportions of anticaking additives may range from about 0.1 up to 10% or more of the weight of the resin. The optimum quantity of anticaking agent depends upon the size and shape of the resin particles, the amount of mechanical loading and manipulation to which the treated resin is subjected and on the character and fineness of the agent; and such quantity is best determined by actual trial and observation of the condition of the resin product or by noting the amount of power required to agitate a reaction charge in a stirred reactor where sticking greatly increases the power consumption. For short, rod-like particles of polyethylene terephthalate which are gently tumbled in a cylindrical polycondensation reactor, 0.5% talc is usually ample. To prevent caking in a vertical cylindrical reactor statically loaded with 20–200 mesh powdered resin, a larger amount of an anticaking agent (e.g., up to 2%) is often desirable. Smaller amounts of a polysiloxane oil ranging down to about 0.1% are generaly sufficient for pelletized polyethylene terephthalate. In the latter case, the polycondensed resin product may be washed with an inert hydrocarbon solvent, such as toluene, to remove oil remaining after the reaction. Similarly, when mineral particles are employed, much of the anticaking agent may be removed by running the product resin pellets over a vibrating screen while passing a strong air current or a suitable inert washing liquid (e.g., hexane or xylene) through the screen; alternatively the agent may be retained on the resin, especially in the case of subsequent molding operations where it can serve as a nucleating agent for promoting crystallization in the molded article.

In the case of solid anticaking additives, the particle size may range from about 30 mesh (U.S. Sieve Series No. 30) to less than 1 micron. In general, smaller particles are more effective in preventing agglomeration of the resin, and an anticaking agent having a particle size smaller than 40 mesh is usually preferred. Even when the anticaking material is not removed from the polycondensed resin, transparent final products are obtainable in certain cases as in employing a fumed silica by reason of its extremely fine particles or in using a clear silicone or fluorocarbon oil in polycondensing resins for eventual extrusion and quenching as films.

The resin is usually subdivided for the polycondensation reaction as by flaking or chopping a film or sheet of the prepolymer into small pieces or by chopping or cutting filaments, ribbons or rods. In addition, the chopped material may be ground or pulverized in a suitable mill to produce a fine powder suitable for polymerization in a fluidized operation. An anticaking solid material may be distributed on the surfaces of resin particles by tumbling the two substances in a rotating horizontal drum or other suitable mixing device, and a liquid agent may be applied by spraying or the resin may be dipped in a bath of the liquid. To control the application of an anticaking oil, it may be appropriately diluted with an inert solvent, such as hexane or xylene, of sufficient volatility to be vaporized soon after polycondensation starts or earlier.

The treated resin need not be subdivided for it can be continuously polycondensed in passing through suitable heated polymerization equipment as a continuous web or strand or bundle of unbroken filaments. For instance, in polycondensations carried out at or near atmospheric pressure, a continuous web, filament or a yarn composed of filaments of the resin can be sprayed with an anticaking oil with or without a diluent or immersed in a bath thereof and then conveyed into an oven operating at polycondensation temperatures and then conducted upward and downward over a large number of rolls or pulleys so arranged in the oven as to provide an adequate residence time for polycondensation to the desired extent while the web or strand moves continuously through the oven. For polycondensing under subatmospheric pressures, a suitable airlock may be provided or perhaps a liquid seal in the form of a sufficiently deep pool of mercury, or another suitable device at each end of the continuous polymerization oven to prevent the entrance of excessive amounts of air.

In many instances, it may be desirable to polycondense the treated resin in the form of a static bed of granules, pellets or flakes of the resin or to employ a fluidized bed of fine resin particles, and continually maintaining a flow of an inert carrier gas (e.g., nitrogen) through the bed is often desirable to promote agitation and to carry off glycol liberated during the polymerization reaction. Regardless of the polymerization system utilized, a vacuum system or other provision should be made for removing the glycol liberated in the reaction.

Suitable polycondensation temperatures may range from a temperature just sufficiently above the threshold temperature of the polymerization reaction (typically 180° C. for polyethylene terephthalate) to provide an acceptable reaction rate up to temperatures within about 5° or less of the melting point of the resin. The actual temperatures differ somewhat for polymers or copolymers of different composition and of different molecular weight or RSV. In the case of polyethylene terephthalate, the polycondensation may be carried out at temperatures ranging from about 200 to 270° C. and preferably in the upper half of that range. In general, the polycondensation temperature is substantially above the original sticking temperature of the resin prior to applying the anticaking agent. Usually, it is preferred to employ the highest temperatures possible while avoiding sticking or agglomeration, sometimes only slightly below the crystalline melting point, in order to achieve the fastest reaction rate; but it may be desirable in some instances to utilize considerably lower polycondensation temperatures (e.g., about 220–235° C. for polyethylene terephthalate) at least in the beginning for reactions of easily deformable resins (i.e., initially having a low softening temperature) in deep or heavily loaded resin beds or beds subjected to intensive mechanical agitation.

In certain instances it may be desirable to employ a technique of progressive heating to higher temperatures along the lines disclosed in my copending application Ser. No. 833,155 in conjunction with the anticaking treatment of the present invention; the disclosure of said application being incorporated here by reference. For example, in cases where it is desirable for any reason to restrict the addition of anticaking substance to such an extent that agglomeration of the treated resin occurs at temperatures significantly below the melting point of the resin (e.g., agglomeration at 10 to 50° C. lower than the melting point), the lightly treated resin may be subjected to an initial stage polycondensation at temperatures below that sticking temperature until the resin sticking temperature increases as the reaction progresses; then the polycondensation temperature may be elevated either gradually or stepwise while remaining below the advancing sticking temperature at all times until eventually the polycondensation temperature is within about 2 to 10° C. of the final crystalline melting point of the resin. The progressive heating technique may also be utilized advantageously in some instances where an adequate quantity of anticaking agent is distributed on the resin; and this may be illustrated by occasions where the treated resin initially has a relatively low softening temperature and accordingly displays a greater tendency toward deformation and agglomeration under a heavy load or mechanical shearing action than a harder resin, because initial polycondensation at relatively low temperatures has been found to markedly increase the softening point of easily deformable polyester resins and thus permit subsequent elevation of the reaction temperature relatively close to the crystalline melting point without subsequent deformation or agglomeration. Also, the heating involved in polycondensation generally increases the crystalline melting point of the resins to an appreciable extent; hence after the reaction has progressed considerably at a relatively low polycondensation temperature, it is then possible to elevate the reaction temperature above the resin melting temperature that existed early in the initial reaction stage and still remain below its elevated melting point. For instance, polyethylene terephthalate resins or prepolymers that have a crystalline melting point of 252° C. may be treated with an anticaking agent and initially polycondensed at temperatures of 245–250° for several hours before being subjected to polycondensation temperatures in the range of about 260–265° for the balance of the condensation reaction after the melting point has risen to about 268–270° during the initial reaction stage. In other embodiments, a treated polyethylene terephthalate resin in either amorphous or the crystalline state may be initially polycondensed at temperatures between about 200 and 230° and thereafter subjected to reaction temperatures in the range of about 240 to 273° C.

In the process of the present invention, crystallization of the resin is optional but it is often desirable inasmuch as it usually produces a substantial increase in the Vicat softening point of the resin and also raises the sticking temperature of the resin. As indicated earlier, these prepolymer materials are typically prepared by melt-polymerization techniques and the molten resin may be converted from the amorphous to the crystalline state by any suitable treatment as exemplified by slowly cooling the extruded or cast polymer melt to room temperature, or a quenched polymer melt in the amorphous state may be crystallized by a controlled heat treatment or by treating the solid resin with organic solvents with vapors or with steam as mentioned hereinbefore. In the case of polyethylene terephthalate prepolymers, their sticking temperatures on stainless steel plates are often in the range of about 110 to 150° C. in the amorphous state, and typically of the order of about 230° after a crystallization heat treatment. Crystallization of polyethylene terephthalate may desirably be performed by heating at temperatures in the range of about 100 to 170° C., and the anticaking agent may be applied to the resin either before, after or even during this heating. At the outset, the temperature of the resin should be kept somewhat below its original or amorphous sticking temperature unless the resin has already been mixed with the anticaking substance, but a somewhat higher temperature may be employed after crystallization has progressed somewhat. While heating at 160° C. for as little as 5 or 10 minutes may induce crystallization in some of these resins, longer residence times are generally desirable when temperatures at the lower end of the range are used. Suitable time-temperatures relationships are readily determined by observing the change in appearance of the particular resin or prepolymer selected as described hereinafter.

The polycondensation of the treated resin may be carried out at pressures in the range of about 0.001 to 1000 mm. of mercury and subatmospheric pressures are often preferred for efficient removal of the glycol evolved. For the same purpose, it is often advantageous to have at least a small flow of an inert gas, such as nitrogen, carbon dioxide, helium or hydrocarbons boiling below 300° C. passing through a polycondensation reactor or apparatus to assist in carrying off the glycol formed.

The time required for polycondensation is dependent upon a number of variables including the composition and molecular weight of the prepolymer, the catalyst employed and the desired molecular weight for the product. In general, the reaction time may range from as little as 10 minutes for the moderate polycondensation of a prepolymer of considerable molecular weight at high temperatures to as much as 48 hours for polymerizing a low order prepolymer to an extremely high molecular weight at a relatively low polycondensation temperature, but more oftentimes with the range of 1 to 20 hours are employed.

A catalyst is generally necessary to obtain polymeric products of high molecular weight, but the catalyst is usually added during the preparation of the prepolymer since the catalysts known to be effective for melt-polymerization also generally provide good results in the solid state polycondensation of polyesters as suggested by L. C. Hsu in NASA Technical Note D–4335 (1968). Many suitable catalysts are set forth in the comprehensive articles of R. E. Wilfond in J. Polymer Sci., 54, 385–510 (1961) and W. Griehl and G. Schnock in J. Polymer Sci., 30, 413–422 (1958) as well as the prior patents cited hereinbefore. Among the many good catalysts are antimony trioxide, zinc acetate, tin oxalate, cobaltous acetate, lithium glycoloxide, germanium dioxide, stannous formate and tetrabutyl titanate, to name only a few.

It will be appreciated that the present process provides significant advantages and flexibility in solid state polycondensation by permitting the use of higher temperatures than were heretofore feasible in solid state polycondensation of polyesters and in permitting the polymerization to be carried to heretofore unobtainable degrees as repeated by an RSV of 4 or more which corresponds to molecular weights of several hundred thousand or higher.

For a better understanding of the nature and objects of this invention as well as its benefits and advantages, reference should be had to the following examples which are set forth for purposes of illustration rather than limitation of the scope of the invention. Unless otherwise specified, all proportions are set forth in terms of weight and all temperatures as degrees centigrade.

Example 1

A melt-polymerized polyethylene terephthalate with a 0.025% content of antimony trioxide catalyst is extruded in the molten state at a temperature of about 280° C. through a circular die as a heavy monofilament of 3/16 inch diameter and immediately quenched in water at 20° C. After drying in air, it is found that this amorphous material is found to have an RSV of 0.7. Upon rubbing a section of the rod-like extrudate against a polished stainless steel plate heated at one end to provide a temperature gradient along its length and pre-calibrated with a thermocouple, the sticking temperature is found to be approximately 140° C. and noticeable softening also occurs at this temperature.

To check the effect of polycondensation temperatures upon this material, the extruded filament is cut into 1/8 inch lengths and 200 grams of the resin pellets are placed in a round-bottomed, cylindrical glass reaction vessel equipped with a rotating steel paddle agitator. Five minutes after this vessel is placed in an oil bath maintained at 200° C., the pellets fuse and form a large plastic mass which makes stirring impossible due to adhesion of the highly viscous material to the wall of the reactor and cohesion within the agglomerate.

One gram of finely ground talc of 325 mesh size is thoroughly mixed with another 200 gram batch of the same pelleted extrudate to coat the surfaces thereof with the talc. This mixture is poured into a similar reaction vessel and then placed in an oil bath heated to 200° C. After 10 minutes of heating with the stirring paddle rotating steadily, it is observed that the pellets become translucent and then opaque—an indication of substantial crystal formation in the resin. No extra power is required for agitating the mixture as the pellets remain in a free flowing condition and display no tendency to either form lumps or stick to either the glass or the steel paddle agitator.

Example 2

Another polyethylene terephthalate prepolymer, also obtained by melt-polymerization and containing 0.025% of antimony trioxide as the catalyst, is similarly pelleted. This material is found to have an RSV of 0.4 and a sticking temperature of 140° C. The resin is transformed from the amorphous state to a substantially crystalline state by heating 400 grams of the untreated pellets in a shallow tray at 160° C. for 1 hour in a circulating air oven and the pellets fuse together to a minor extent.

Upon cooling, the pellets are broken apart with relative ease and a 200-gram batch is charged into a glass reactor as in Example 1. The reactor is evacuated to a subatmospheric pressure of 0.1 mm. mercury and then placed in an oil bath maintained at 260° C. After a 10 minute heating period, the adhesion of resin pellets to the glass wall is noticed and stirring soon becomes impossible as the stirring paddle compacts the softened pellets into a large agglomerated mass.

Two grams (1%) of silica aerosil (Cab-O-Sil® M–5) of 0.012 micron particle size is thoroughly mixed with the remaining 200 grams of the crystallized pellets and introduced into a clean glass reaction vessel of the same type. Upon similarly heating the treated pellets at the same low pressure by immersion of the reactor in the 260° C. oil bath for a period of 5 hours to effect polycondensation of the resin, the pellets remain in a loose or discrete state throughout the treatment and no difficulty is encountered in stirring the material. A sample of the pellets removed after 2 hours of heating is found to have an RSV of 1.04 and this value increases to 1.2 in the course of the next 3 hours. Accordingly, it is apparent that a substantial increase in molecular weight occurs in the process.

Example 3

Another sample of the polyethylene terephthalate prepolymer of Example 2 in pelleted form is converted into the crystalline state by heating at 150° C. for more than an hour. After thoroughly mixing 0.5 gram of 325 mesh talc with 100 grams of the pellets, the mixture is placed in a stirred glass reactor as before and evacuated to an absolute pressure of only 0.005 mm. while the flash is heated in an oil bath at 200° C. for 30 minutes. From a sample taken at this time, it is determined that the RSV is 0.41 which is indicative that little or no polymerization is occurring. Then the temperature of the oil bath is increased to 250° C. and a flow of nitrogen through the pellets at essentially atmospheric pressure is maintained for the remainder of the heating period. Samples are removed for viscosity determinations at intervals during the reaction, and the RSV is found to be 0.57 after two hours at 250° C., 0.60 after four hours and 0.75 when the reaction is terminated by cooling after 6.5 hours. No difficulties are encountered in either stirring or subsequently removing the charge.

Example 4

Still another sample of the pelleted prepolymer of Example 2 is crystallized by heating at 150° C., and 100 grams of the pellets are mixed with 0.5 gram of powdered precipitated aluminum hydroxide. A glass reactor equipped with an agitator like that of Example 1 is loaded with these treated pellets and first heated in a 200° C. oil bath for 30 minutes and then at 250° C. for 5.5 hours while maintaining a pressure of 0.005 mm. mercury in the reaction vessel. No problems arise from either adhesion or agglomeration, and the RSV of the material is raised from 0.40 to 0.80 by this treatment.

Example 5

A similar polyethylene terephthalate prepolymer with an RSV of 0.4 and a melting point of 263° C. is crystallized by heating at 150° C. as before; then 100 grams of the resin pellets are thoroughly mixed with 1 gram of the same fine talc. Upon heating this mixture under an absolute pressure of 0.005 mm. with stirring in the glass flask of Example 1 for one hour in an oil bath maintained at 260° C., the RSV of the resin is found to be 0.53; then the bath temperature is raised to 270° C. for another hour and the RSV rises to 0.77. No significant adhesion or agglomeration is observed at these high temperatures. However, during a continuation of the reaction of 1.5 hours duration with the bath temperature raised to 275° C., melting of the resin occurs. The RSV of this final product is found to be somewhat above 1.0.

Example 6

Still another polyethylene terephthalate of somewhat higher molecular weight (0.7 RSV) is extruded, pelleted and crystallized as before. Then 100 grams of this material is mixed with 1.0 gram of the same talc and heated under vacuum with stirring as before. After one hour in an oil bath maintained at 260° C. the RSV is found to be 0.86; then the bath temperature is raised to 265° and the RSV increases to 1.10 in another hour, to 1.19 in the next hour and finally to 1.24 after five hours at 265°. Again, no difficulties are encountered from sticking or agglomeration of the pellets.

Example 7

Still another polyethylene terephthalate prepolymer with an RSV of 0.6 and the same catalyst is cooled in liquid nitrogen and ground in a laboratory mill to a particle size range of 20 to 200 mesh. This powder is poured to completely fill a thin walled reaction tube of stainless steel with a length of 4 feet and an outside diameter of 0.75 inch which is equipped with a gas inlet at the bottom and outlet at the top. Helium is passed through the deep bed of loose powder in this tube at the rate of 1 liter per minute while the tube is heated in an oven at 255° C. for 24 hours. After cooling and opening the tube, it is found that the resin is now agglomerated into a number of firm, compacted and sintered cylindrical masses.

Another portion of the same powdered resin is subjected to polycondensation in the same manner in the reaction tube after the addition of 1% of the 325 mesh talc and prolonged stirring to provide a uniform mixture of the talc and resin. At the end of the 24 hour heating period, the cooled charge is easily removed from the tube as small, friable articles of polyethylene terephthalate and the RSV of this material is found to be 2.75.

While the instant invention has bee described in specific detail in a limited number of embodiments for purposes of full disclosure and valid comparisons, it will be apparent to those skilled in the art that there are many other embodiments and modifications encompassed within the purview of this invention. Accordingly, the present invention should not be considered as limited in any particulars except as may be set forth in the appended claims or required by the prior art.

What is claimed is:

1. A process for increasing the molecular weight of glycol-terephthalate resins which comprises distributing an inert heat-resistant anticaking agent on the surface of solid thermoplastic linear polymers of at least one ester of at least one dihydric alcohol and at least one carbocyclic dicarboxylic acid, and thereafter subjecting the resulting treated resin in the solid state to polycondensation conditions for a period sufficient to substantially increase the molecular weight of said resin and at a temperature substantially higher than the sticking temperature of said resin in the absence of said anticaking agent.

2. A process according to claim 1 in which 100 parts by weight of the said resin are treated with between about 0.1 and 10 parts of said anticaking agent.

3. A process according to claim 1 in which terephthalic acid constitutes at least a major proportion of said acid.

4. A process according to claim 1 in which a lower alkylene glycol constitutes at least a major proportion of said alcohol.

5. A process according to claim 1 in which said resin is polyethylene terephthalate.

6. A process according to claim 1 in which said anticaking agent is a refractory substance of the group consisting of solid minerals, oxides and carbonates of silicon, aluminum, titanium, calcium, iron and magnesium, and nonalkali metal soaps of higher fatty acids in finely divided particle form, liquid polysiloxanes boiling above 300° C. and liquid fluorocarbons boiling above 300° C.

7. A process according to claim 6 in which 100 parts by weight of the said resin are treated with between about 0.1 and 3 parts of said anticaking agent.

8. A process according to claim 7 in which said resin comprises polyethylene terephthalate.

9. A process according to claim 8 in which the polycondensation temperature is at least about 240° C.

10. A process according to claim 1 in which the polycondensation reaction temperature is elevated substantially after polycondensation has progressed to a substantial extent.

11. A process according to claim 10 in which said temperature is elevated after the crystalline melting point of said resin has increased substantially during the initial stage of polycondensation.

12. A process according to claim 10 in which polyethylene terephthalate is subjected to initial polycondensation at a temperature between about 200 and 230° and thereafter to further polycondensation at a temperature between about 240 and 273° C.

13. A process according to claim 1 in which said resin initially has a reduced specific viscosity (5 grams per liter of equal weights of phenol and tetrachloroethane at 25° C.) of at least about 0.2.

14. A process according to claim 13 in which 100 parts of said resin is treated with between about 0.1 and 10 parts by weight of said anticaking agent.

15. A process according to claim 13 in which said resin is polyethylene terephthalate having a reduced specific viscosity between about 0.4 and 1.3 prior to treatment with said anticaking agent.

16. A process according to claim 13 in which 100 parts of particles of a polyethylene terephthalate having a reduced specific viscosity between about 0.4 and 1.3 are treated with between about 0.1 and 3 parts by weight of an anticaking agent of the group consisting of inert refractory minerals and oxides of silicon, aluminum, titanium, calcium, iron and magnesium in finely divided particle form.

17. A process according to claim 16 in which the polycondensation temperature is at least about 245° C.

18. A process according to claim 16 in which said anticaking agent is talc.

19. A process according to claim 16 in which said anticaking agent is a silica aerosil.

References Cited

UNITED STATES PATENTS 3,390,134    6/1968    Kibler _____ 260—75
3,405,098    10/1968   Heighton et al. _____ 260—75

FOREIGN PATENTS 6,709,077    1/1968    Netherlands.
3,814,823    8/1963    Japan.

WILLIAM H. SHORT, Primary Examiner

M. GOLDSTEIN, Assistant Examiner

PO-1050
(5/69)

UNITED STATES PATENT OFFICE
CERTIFICATE OF CORRECTION

Patent No. 3,544,523          Dated January 19, 1971

Inventor(s) EMIL J. MAXION

It is certified that error appears in the above-identified patent and that said Letters Patent are hereby corrected as shown below:

Column 2, line 63:    for "a" read -- at --

Column 2, line 72:    for "substantially" read -- substanti

Column 4, line 7:     for "production" read -- productive -

Column 4, line 65:    for "4.0" read -- 0.4 --

Column 10, line 43:   for "flash" read -- flask --

Column 11, line 48:   for "bee" read -- been --

Signed and sealed this 30th day of March 1971.

(SEAL)
Attest:

EDWARD M. FLETCHER, JR.          WILLIAM E. SCHUYLER, JR
Attesting Officer                 Commissioner of Patents